US009338635B2

(12) United States Patent
Palin et al.

(10) Patent No.: US 9,338,635 B2
(45) Date of Patent: May 10, 2016

(54) METHOD, APPARATUS, AND COMPUTER PROGRAM PRODUCT FOR DEVICE TRACKING

(71) Applicant: Nokia Corporation, Espoo (FI)

(72) Inventors: Arto Palin, Viiala (FI); Jukka Reunamaki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 121 days.

(21) Appl. No.: 14/320,820

(22) Filed: Jul. 1, 2014

(65) Prior Publication Data

US 2016/0007181 A1    Jan. 7, 2016

(51) Int. Cl.
  H04W 8/00   (2009.01)
  H04W 4/00   (2009.01)
  H04B 17/10  (2015.01)

(52) U.S. Cl.
  CPC .............. *H04W 8/005* (2013.01); *H04B 17/10* (2015.01); *H04W 4/008* (2013.01)

(58) Field of Classification Search
  CPC .................................................... H04W 4/008
  USPC ...................................... 455/41.1, 41.2, 41.3
  See application file for complete search history.

(56) References Cited

U.S. PATENT DOCUMENTS

| 5,530,702 | A  | 6/1996  | Palmer et al. |
| 6,816,063 | B2 | 11/2004 | Kubler et al. |
| 6,892,052 | B2 | 5/2005  | Kotola et al. |
| 7,075,412 | B1 | 7/2006  | Reynolds et al. |
| 7,151,764 | B1 | 12/2006 | Heinonen et al. |
| 7,519,682 | B2 | 4/2009  | Smith et al. |
| 7,775,432 | B2 | 8/2010  | Jalkanen et al. |

(Continued)

FOREIGN PATENT DOCUMENTS

| EP | 2073514 | 6/2009 |
| EP | 2355563 | 8/2011 |

(Continued)

OTHER PUBLICATIONS

International Search Report for International Application No. PCT/FI2012/050442—Date of Completion of Search: Sep. 18, 2012—4 pages.

(Continued)

*Primary Examiner* — Wen Huang
(74) *Attorney, Agent, or Firm* — Locke Lord LLP

(57) ABSTRACT

In an example embodiment, a method includes measuring, by an apparatus, signal strength of wireless device discovery messages received from a wireless communication device, the wireless discovery messages including a device address of the wireless communication device; storing, by the apparatus, the device address of the wireless communication device and the measured signal strength of the received wireless discovery messages; detecting, by apparatus, other wireless device discovery messages having a different device address; measuring, by apparatus, received signal strengths of the other wireless device discovery messages; and if no messages are received including the device address of the wireless communication device, comparing, by apparatus, the stored signal strength of the wireless discovery messages received from the wireless communication device with the measured received signal strength of the other wireless device discovery messages to determine whether a source of the other wireless device discovery messages is the wireless communication device.

15 Claims, 10 Drawing Sheets

(56) References Cited

U.S. PATENT DOCUMENTS

| | | |
|---|---|---|
| 8,210,433 B2 | 7/2012 | Jalkanen et al. |
| 2001/0045460 A1 | 11/2001 | Reynolds et al. |
| 2002/0021809 A1 | 2/2002 | Salo et al. |
| 2002/0022961 A1 | 2/2002 | Sepanaho |
| 2002/0023264 A1 | 2/2002 | Aaltonen et al. |
| 2002/0069406 A1 | 6/2002 | Aaltonen et al. |
| 2002/0071436 A1 | 6/2002 | Border et al. |
| 2002/0087997 A1 | 7/2002 | Dahlstrom |
| 2002/0191998 A1 | 12/2002 | Cremon et al. |
| 2003/0043041 A1 | 3/2003 | Zeps et al. |
| 2003/0084177 A1 | 5/2003 | Mulligan |
| 2003/0097304 A1 | 5/2003 | Hunt |
| 2003/0120745 A1 | 6/2003 | Katagishi et al. |
| 2003/0134653 A1 | 7/2003 | Sarkkinen et al. |
| 2003/0220765 A1 | 11/2003 | Overy et al. |
| 2003/0228846 A1 | 12/2003 | Berliner et al. |
| 2004/0193676 A1 | 9/2004 | Marks |
| 2004/0203413 A1 | 10/2004 | Harumoto |
| 2004/0225199 A1 | 11/2004 | Evanyk et al. |
| 2005/0003827 A1* | 1/2005 | Whelan ................. H04W 16/10 455/454 |
| 2005/0054290 A1 | 3/2005 | Logan et al. |
| 2005/0073522 A1 | 4/2005 | Aholainen et al. |
| 2007/0047505 A1 | 3/2007 | Wassingbo |
| 2007/0141984 A1 | 6/2007 | Kuehnel et al. |
| 2007/0141985 A1 | 6/2007 | Parkkinen et al. |
| 2007/0275746 A1 | 11/2007 | Bitran |
| 2007/0291710 A1 | 12/2007 | Fadell |
| 2008/0004021 A1 | 1/2008 | Sanjay |
| 2008/0055632 A1 | 3/2008 | Oshiumi et al. |
| 2008/0090606 A1 | 4/2008 | Hwang et al. |
| 2008/0146151 A1 | 6/2008 | Lyu et al. |
| 2008/0242220 A1 | 10/2008 | Wilson et al. |
| 2008/0311957 A1 | 12/2008 | Jantunen et al. |
| 2010/0082784 A1 | 4/2010 | Rosenblatt et al. |
| 2010/0093280 A1 | 4/2010 | Ahn et al. |
| 2010/0105328 A1 | 4/2010 | Ahn et al. |
| 2010/0144274 A1 | 6/2010 | McDowall et al. |
| 2010/0211698 A1 | 8/2010 | Krishnaswamy |
| 2010/0241529 A1 | 9/2010 | Kim |
| 2010/0250135 A1 | 9/2010 | Li et al. |
| 2011/0140864 A1 | 6/2011 | Bucci |
| 2011/0140883 A1 | 6/2011 | Yamashita |
| 2011/0235624 A1 | 9/2011 | Scott et al. |
| 2011/0281519 A1* | 11/2011 | Reuss ................. H04W 8/005 455/41.2 |
| 2011/0317586 A1 | 12/2011 | Palanki et al. |
| 2012/0015605 A1 | 1/2012 | Sole |
| 2012/0017257 A1 | 1/2012 | Lee et al. |
| 2012/0169473 A1 | 7/2012 | Jalkanen et al. |
| 2012/0289157 A1 | 11/2012 | Palin et al. |
| 2012/0289158 A1 | 11/2012 | Palin et al. |
| 2012/0289159 A1 | 11/2012 | Palin et al. |
| 2013/0111120 A1 | 5/2013 | Ananthakrishnan et al. |
| 2013/0217333 A1* | 8/2013 | Sprigg ................. H04W 4/008 455/41.2 |
| 2014/0194062 A1 | 7/2014 | Palin et al. |
| 2014/0304770 A1* | 10/2014 | Jung ................. H04W 12/12 726/2 |

FOREIGN PATENT DOCUMENTS

| | | |
|---|---|---|
| EP | 2424281 | 2/2012 |
| WO | WO0051293 | 8/2000 |
| WO | WO0067221 | 11/2000 |
| WO | WO 01/45319 A1 | 6/2001 |
| WO | WO01/52179 | 7/2001 |
| WO | WO 02/11074 | 2/2002 |
| WO | WO2004038938 | 5/2004 |
| WO | WO2007040398 | 4/2007 |
| WO | WO2008072057 | 6/2008 |
| WO | WO2009013646 | 1/2009 |
| WO | WO2009158663 | 12/2009 |
| WO | WO2012127095 | 9/2012 |
| WO | WO2013083868 | 6/2013 |
| WO | WO2013132134 A1 | 9/2013 |

OTHER PUBLICATIONS

European Search Report for EP Application No. 08006467.8-2412/1965555 dated Nov. 2, 2011.

Extended European Search Report for European Patent Application No. 12167079.8-2412—dated Jul. 30, 2012.

Office Action for Korean Application No. 10-2006-7009441 dated Apr. 23, 2007.

Notice of Allowance for Korean Application No. 10-2006-7009441 dated Jan. 7, 2008.

Palin, A., et al., "VoIP call over WLAN with Bluetooth headset—multiradio interoperability solutions", 2005 IEEE Application No. 12167079.8-2412—Date of Completion of Search: Jul. 13, 2012, 12 pages.

"Bluetooth Specification Version 4.0", Jun. 30, 2010, pp. 380-767.

Widmer. P., "Smart Box Software Framework", Vision Document, Apr. 7, 2003, 23 pages.

Opposition Notice and Filing in European Application No. 1 685 689 (No Translation).

Opposition Response in European Application Patent No. 1 685 689.

International Search Report for International Application No. PCT/FI2013/050085 mailed May 13, 2013.

International Search Report for International Application No. PCT/FI2012/050531—Date of Completion of Search: Sep. 3, 2012—4 pages.

European Search Report for European Patent Application No. 12166717.4-2412—dated Jul. 20, 2012.

Radio Frequency Identification RFID—A basic primer, AIM Inc. White Paper; Aug. 23, 2001; 17 pages; 1.2; The Association of the Automatic Identification and Data Capture Industry (AIM Inc.); WP-98/002R2.

* cited by examiner

METHOD, APPARATUS, AND COMPUTER PROGRAM PRODUCT FOR DEVICE TRACKING

FIELD

The technology field relates to wireless communication, more particularly to facilitating device tracking using received signal strength.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

One example of a wireless short-range communication technology is the Bluetooth™ Low Energy. The Bluetooth™ *Core Specification, Version* 4.0, Bluetooth™ SIG, Jun. 30, 2010 (incorporated herein by reference), includes the Bluetooth LE protocol for products that require lower power consumption, lower complexity, and lower cost than would be possible using the Bluetooth basic rate/enhanced data rate (BR/EDR) protocol. Bluetooth LE is designed for applications not requiring high data rate, but a very-low power idle mode and a simple device discovery.

SUMMARY

Method, apparatus, and computer program product example embodiments enhance wireless device tracking An example embodiment of the invention includes a method comprising:

measuring, by an apparatus, signal strength of wireless device discovery messages received from a wireless communication device, the wireless discovery messages including a device address of the wireless communication device;

storing, by the apparatus, the device address of the wireless communication device and the measured signal strength of the received wireless discovery messages;

detecting, by the apparatus, other wireless device discovery messages having a different device address;

measuring, by the apparatus, received signal strengths of the other wireless device discovery messages; and if no messages are received including the device address of the wireless communication device, comparing, by the apparatus, the stored signal strength of the wireless discovery messages received from the wireless communication device with the measured received signal strength of the other wireless device discovery messages to determine whether a source of the other wireless device discovery messages is the wireless communication device.

An example embodiment of the invention includes a method comprising:

if it is determined that the source of the other wireless discovery messages is the wireless communication device, associating and storing the device address and the measured received signal strength of the other wireless device discovery messages, to the wireless communication device.

An example embodiment of the invention includes a method comprising:

wherein two or more wireless discovery messages are received from the wireless communication device at a first measured periodic interval;

storing, by the apparatus, the first measured periodic interval of the two or more wireless discovery messages;

detecting, by the apparatus, two or more other wireless discovery messages having the different device address, at a second measured periodic interval; and determining, by the apparatus, whether the two or more other wireless discovery messages are received from the wireless communication device by comparing the stored first measured periodic interval with the second measured periodic interval.

An example embodiment of the invention includes a method comprising:

if it is determined that the source of the two or more other wireless discovery messages is the wireless communication device, by the comparison of the measured periodic intervals, associating and storing the device address of the two or more other device discovery messages and the second measured periodic interval, to the wireless communication device.

An example embodiment of the invention includes a method comprising:

wherein the wireless discovery messages are Bluetooth Low Energy advertising messages.

An example embodiment of the invention includes a method comprising:

wherein the wireless discovery messages received from the wireless communication device include a unique identifier;

if it is determined that the source of the other wireless discovery messages is the wireless communication device, associating and storing the unique identifier, the device address of the other device discovery messages, and the measured received signal strength of the other wireless device discovery messages, to the wireless communication device.

An example embodiment of the invention includes a method comprising:

wherein the wireless discovery messages received from the wireless communication device include a unique identifier;

if it is determined that the source of the two or more other wireless discovery messages is the wireless communication device, by the comparison of the measured periodic intervals, associating and storing the unique identifier, the device address of the two or more other device discovery messages, and the second measured periodic interval, to the wireless communication device.

An example embodiment of the invention includes an apparatus comprising:

at least one processor;
at least one memory including computer program code;
the at least one memory and the computer program code configured to, with the at least one processor, cause the apparatus at least to:

measure signal strength of wireless device discovery messages received from a wireless communication device, the wireless discovery messages including a device address of the wireless communication device;

store the device address of the wireless communication device and the measured signal strength of the received wireless discovery messages;

detect other wireless device discovery messages having a different device address;

measure received signal strengths of the other wireless device discovery messages; and if no messages are received including the device address of the wireless communication device, compare the stored signal strength of the wireless discovery messages received from the wireless communication device with the measured received signal strength of the other wireless device discovery messages to determine whether a source of the other wireless device discovery messages is the wireless communication device.

An example embodiment of the invention includes an apparatus comprising:

the at least one memory and the computer program code configured to, with the at least one processor, cause the apparatus at least to:

if it is determined that the source of the other wireless discovery messages is the wireless communication device, associate and store the device address and the measured received signal strength of the other wireless device discovery messages, to the wireless communication device.

An example embodiment of the invention includes an apparatus comprising:

the at least one memory and the computer program code configured to, with the at least one processor, cause the apparatus at least to:

wherein two or more wireless discovery messages are received from the wireless communication device at a first measured periodic interval;

storing, by the apparatus, the first measured periodic interval of the two or more wireless discovery messages;

detecting, by the apparatus, two or more other wireless discovery messages having the different device address, at a second measured periodic interval; and determining, by the apparatus, whether the two or more other wireless discovery messages are received from the wireless communication device by comparing the stored first measured periodic interval with the second measured periodic interval.

An example embodiment of the invention includes an apparatus comprising:

the at least one memory and the computer program code configured to, with the at least one processor, cause the apparatus at least to:

if it is determined that the source of the two or more other wireless discovery messages is the wireless communication device, by the comparison of the measured periodic intervals, associate and store the device address of the two or more other device discovery messages and the second measured periodic interval, to the wireless communication device.

An example embodiment of the invention includes an apparatus comprising:

wherein the wireless discovery messages are Bluetooth Low Energy advertising messages.

An example embodiment of the invention includes an apparatus comprising:

the at least one memory and the computer program code configured to, with the at least one processor, cause the apparatus at least to:

wherein the wireless discovery messages received from the wireless communication device include a unique identifier;

if it is determined that the source of the other wireless discovery messages is the wireless communication device, associate and store the unique identifier, the device address of the other device discovery messages, and the measured received signal strength of the other wireless device discovery messages, to the wireless communication device.

An example embodiment of the invention includes an apparatus comprising:

the at least one memory and the computer program code configured to, with the at least one processor, cause the apparatus at least to:

wherein the wireless discovery messages received from the wireless communication device include a unique identifier;

if it is determined that the source of the two or more other wireless discovery messages is the wireless communication device, by the comparison of the measured periodic intervals, associate and store the unique identifier, the device address of the two or more other device discovery messages, and the second measured periodic interval, to the wireless communication device.

An example embodiment of the invention includes a computer program product comprising computer executable program code recorded on a computer readable, non-transitory storage medium, the computer executable program code comprising:

code for measuring, by an apparatus, signal strength of wireless device discovery messages received from a wireless communication device, the wireless discovery messages including a device address of the wireless communication device;

code for storing, by the apparatus, the device address of the wireless communication device and the measured signal strength of the received wireless discovery messages;

code for detecting, by the apparatus, other wireless device discovery messages having a different device address;

code for measuring, by the apparatus, received signal strengths of the other wireless device discovery messages; and code for if no messages are received including the device address of the wireless communication device, comparing, by the apparatus, the stored signal strength of the wireless discovery messages received from the wireless communication device with the measured received signal strength of the other wireless device discovery messages to determine whether a source of the other wireless device discovery messages is the wireless communication device.

An example embodiment of the invention includes a computer program product comprising:

wherein two or more wireless discovery messages are received from the wireless communication device at a first measured periodic interval;

code for storing, by the apparatus, the first measured periodic interval of the two or more wireless discovery messages;

code for detecting, by the apparatus, two or more other wireless discovery messages having the different device address, at a second measured periodic interval; and code for determining, by the apparatus, whether the two or more other wireless discovery messages are received from the wireless communication device by comparing the stored first measured periodic interval with the second measured periodic interval.

An example embodiment of the invention includes a computer program product comprising:

code for if it is determined that the source of the two or more other wireless discovery messages is the wireless communication device, by the comparison of the measured periodic intervals, associating and storing the device address of the two or more other device discovery messages and the second measured periodic interval, to the wireless communication device.

An example embodiment of the invention includes a computer program product comprising:

wherein the wireless discovery messages are Bluetooth Low Energy advertising messages and the wireless discovery messages received from the wireless communication device include a unique identifier;

code for if it is determined that the source of the two or more other wireless discovery messages is the wireless communication device, by the comparison of the measured periodic intervals, associating and storing the unique identifier, the device address of the two or more other device discovery messages, and the second measured periodic interval, to the wireless communication device.

The resulting example embodiments enhance wireless device tracking

DISCUSSION OF EXAMPLE EMBODIMENTS OF THE INVENTION

Figure 1A:
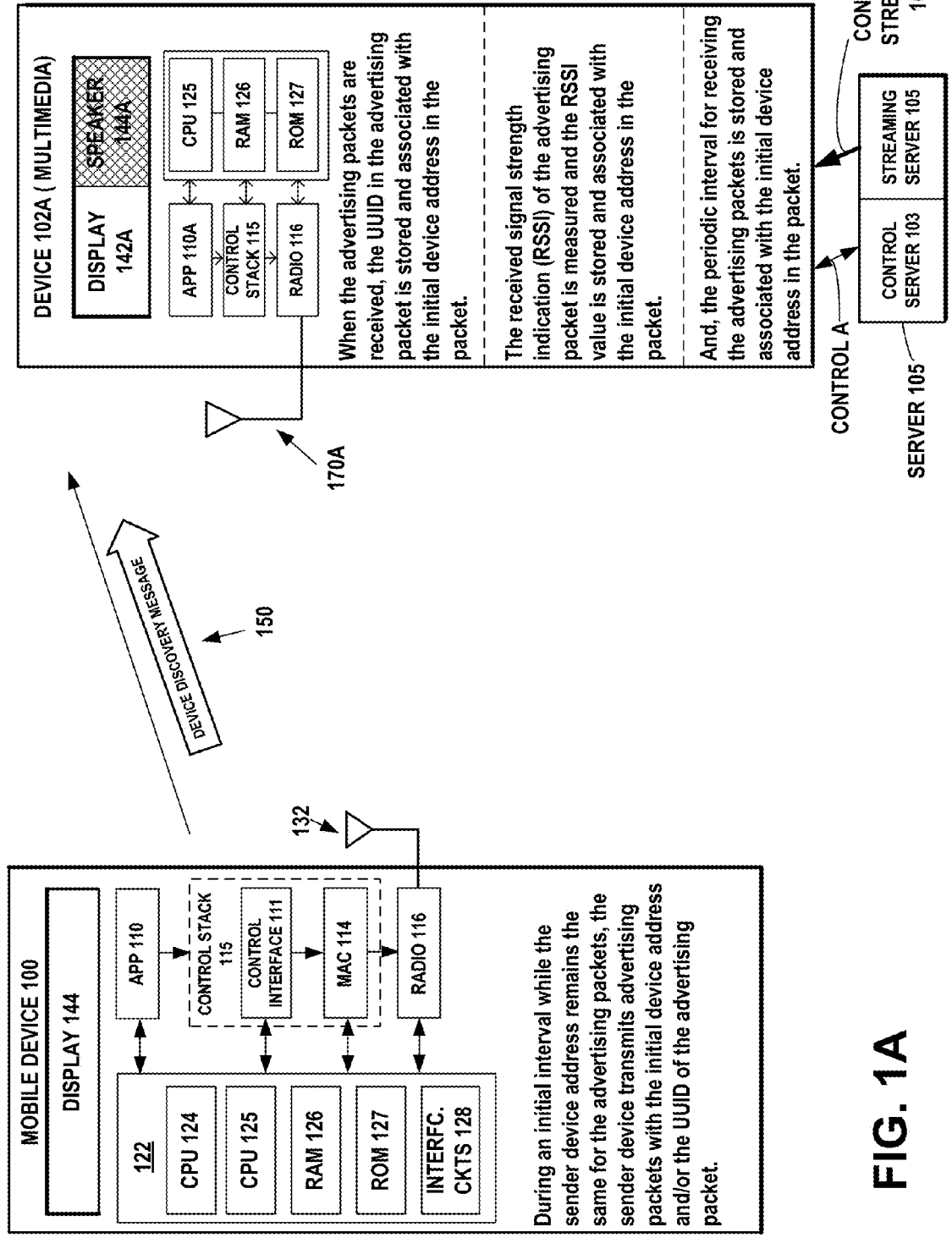
FIG. 1A is an illustration of an example embodiment of a network in a device discovery phase, in accordance with at least one embodiment of the present invention.

This section is organized into the following topics:
A. Wireless Short-Range Communication Networks
B. Bluetooth™ Low Energy (LE) Technology
C. Bluetooth™ Low Energy Device Tracking
A. Wireless Short-Range Communication Networks Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), ZigBee (IEEE 802.15.4, IEEE 802.15.4a), and near field communication technologies, such as radio frequency identification (RFID) and near field communication (NFC) technology that enable contactless identification and interconnection of wireless devices. Bluetooth LE technology provides an example of wireless short-range communication establishment.

B. Bluetooth™ Low Energy (LE) Technology

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, each separated by 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

Devices that transmit advertising packets on the advertising PHY channels are referred to as advertisers. Devices that receive advertising on the advertising channels without the intention to connect to the advertising device are referred to as scanners. Transmissions on the advertising PHY channels occur in advertising events. At the start of each advertising event, the advertiser sends an advertising packet corresponding to the advertising event type. Depending on the type of advertising packet, the scanner may make a request to the advertiser on the same advertising PHY channel which may be followed by a response from the advertiser on the same advertising PHY channel. The advertising PHY channel changes on the next advertising packet sent by the advertiser in the same advertising event. The advertiser may end the advertising event at any time during the event. The first advertising PHY channel is used at the start of the next advertising event.

For all undirected advertising events, the time between the start of two consecutive advertising events (T_advEvent) is computed for each advertising event as follows:

$$T\_advEvent = advInterval + advDelay.$$

The advInterval is an integral multiple of 0.625 ms in the range of 20 ms to 10.24 s. If the advertising event type is either a scannable undirected event type or a non-connectable undirected event type, the advInterval is not less than 100 ms. If the advertising event type is a connectable undirected event type, the advInterval may be 20 ms or greater.

The advDelay is a pseudo-random value with a range of 0 ms to 10 ms generated by the Link Layer for each advertising event. Devices that are trying to form a connection to another device listen for connectable advertising packets. Such devices are referred to as initiators. If the advertiser is using a connectable advertising event, an initiator may transmit a connection request using the same advertising PHY channel on which it received the connectable advertising packet. The advertising event is ended and connection events begin if the advertiser receives and accepts the request for a connection be initiated. Once a connection is established, the initiator becomes the master device in what is referred to as a piconet and the advertising device becomes the slave device. Connection events are used to send data packets between the master and slave devices.

The format of Advertising data and Scan Response data consists of a significant part and a non-significant part. The significant part contains a sequence of AD structures. Each AD structure may have a Length field of one octet, which contains the Length value, and a Data field of Length octets. The first octet of the Data field contains the AD type field. The content of the remaining Length—1 octet in the Data field depends on the value of the AD type field and is called the AD data. The non-significant part extends the Advertising and Scan Response data to 31 octets and may contain all-zero octets.

Devices are identified using a device address. Device addresses may be either a public device address or a random device address. A public device address and a random device address are both 48 bits in length. A device may contain at least one type of device address and may contain both.

The public device address may be created in accordance with section 9.2 ("48-bit universal LAN MAC addresses") of the IEEE 802-2001 standard (http://standards.ieee.org/get-ieee802/download/802-2001.pdf) and using a valid Organizationally Unique Identifier (OUI) obtained from the IEEE Registration Authority (http://standards.ieee.org/regauth/oui/forms/ and sections 9 and 9.1 of the IEEE 802-2001 specification).

The public device address is divided into the following two fields:
- company assigned field is contained in the 24 least significant bits
- company_id field is contained in the 24 most significant bits The random device address may be of either of the following two sub-types:
- Static address
- Private address The private address may be of either of the following two sub-types:
- Non-resolvable private address
- Resolvable private address Static and non-resolvable private address both contains address that is random. The main difference is that the device may not change its static address value once initialized until the device is power cycled.

The random resolvable private device address is divided into the following two fields which can be used to identify the device:
- hash field is contained in the 24 least significant bits, as defined in [Vol. 3] Part C, Section 10.8.2.3 of the Bluetooth™ Core Specification, Version 4.0.
- random field is contained in the 24 most significant bits, as defined in [Vol. 3] Part C, Section 10.8.2.2 of the Bluetooth™ Core Specification, Version 4.0.

The Bluetooth LE Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Basic Rate/Enhanced Data Rate (BR/EDR) radio. Bluetooth LE supports very short data packets, from 10 octets to a maximum of 47 octets, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.0, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

The initiator device that receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner/initiator devices are not allowed to transmit anything in the advertising channels upon receiving the ADV_ONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.0, if the advertiser is using a connectable advertising event, an initiator may make a connection request using the same advertising PHY channel on which it received the connectable advertising packet. The advertising event is ended and connection events begin if the advertiser receives and accepts the request for a connection to be initiated. Once a connection is established, the initiator becomes the master device in a piconet and the advertising device becomes the slave device. Within a connection event, the master and slave alternate sending data packets using the same data PHY channel.

According to the Bluetooth Specification V4.0, Bluetooth LE device discovery involves different operational processes for devices with different roles. In particular:

Slave Device, being an advertiser, performs an advertising process during which the device repeatedly enters Advertising Events. The interval of each start of Advertising Event, Ta, composes of a fixed-length "advInterval" and a random-length "advDelay". In Advertising Event, the device sends advertising Packet Data Units (PDUs) in broadcasting channel 37, 38 and 39, respectively.

Master Device, being an initiator/scanner, performs the initiating/scanning process. An initiating/scanning process consists of repeated "scanInterval", each of which contains a "scanWindow". In a different "scanWindow", the device changes the RF module to receive the state and listens to advertising PDUs on different broadcasting channels; while out of the "scanWindow", it does routine scheduling, or turns off the RF module.

If any advertising PDU is received by an initiator/scanner, it means the initiator/scanner successfully discovers the advertising device. For the initiator, it can directly send back a "CONN_REQ" to establish a connection with that advertiser. For a scanner, it can send out a "SCAN_REQ" to ask for more information from that advertiser.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

A Bluetooth LE advertising channel may be shared by any number of Bluetooth LE devices. Any number of Bluetooth LE devices may transmit advertising packets while sharing the same three advertising PHY channels. In high-density environments, however, since there are a large number of nodes to be discovered, the probability of broadcasting conflict will inevitably increase, causing network access time to increase, and also lowering the energy efficiency of the whole network.

1. Bluetooth™ RSSI

The received signal strength indicator (RSSI) is a measurement of the power present in a received radio signal. Bluetooth receiver circuits may include an RSSI detector circuit to measure the strength of an incoming signal and generate an output representing the signal strength. For example, the received RF signal may be amplified and downconverted to an intermediate frequency (IF); then channel selection is performed on the IF signal, and the power of the IF signal in the selected channel is measured as the receiver signal strength indicator (RSSI) value. If the Bluetooth receiver circuit supports RSSI, the accuracy may be +/−6 dBm or better.

RSSI Monitoring of Bluetooth LE Packets

During Bluetooth discovery in Bluetooth LE, before a connection is created, the RSSI may be measured from advertising packets received in broadcasting channel 37, 38, or 39, when they are received by a scanning device, if enabled by the host.

When the controller receives an advertising packet, an HCI LE Advertising Report event is sent by the controller to the host application. The HCI LE Advertising Report event indicates that a Bluetooth device or multiple Bluetooth devices have been detected during an active scan or during a passive scan. The HCI LE Advertising Report event includes a parameter N that indicates the RSSI of the received packet, with N being one octet representing the magnitude of the RSSI, with a range in units of dBm of $-127 \leq N \leq +20$. This event will be sent from the Controller to the Host as soon as an advertising packet from a remote device is received. The RSSI parameter is measured during the receipt of the advertising packet. This event contains RSSI and advertising packet data for the remote device, among other information.

RSSI Monitoring of Data Packets Received Over a Connection

After the discovery phase is completed, once a Bluetooth LE device is connected to another Bluetooth device, the received signal strength indication (RSSI) may be used by a receiving device to monitor the received power level of the data communication packets received over the connection. The RSSI value is calculated from received packet in the Bluetooth physical layer, and may be read by the host application for example through the host controller interface (HCI) Read RSSI command, for example once per second.

The Read RSSI Command will read the value of the received signal strength indication (RSSI) for data communication packets received over the connection to another Bluetooth LE controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

In Bluetooth LE, the meaning of the RSSI metric is an absolute receiver signal strength value in dBm to ±6 dBm accuracy. If the RSSI cannot be read, the RSSI metric is set to 127. (When the Read_RSSI command has completed, a Command Complete event is generated.)

Measuring Pathloss with the RSSI and the TX Power Level

The TX Power Level data field in the Bluetooth LE advertising packet indicates the transmitted power level of the advertising packets at the transmitter of the sending device. The TX Power Level is reported to the host in response to the HCI LE Read Advertising Channel Tx Power Command. The TX Power Level data field may be used to calculate path loss of a received packet when the receiving device measures the RSSI of the received advertising packet, using the following equation:

$$pathloss = Tx\ Power\ Level - RSSI\ of\ the\ inquiry\ response\ packet$$

For example, if Tx Power Level=+4 (dBm) and the RSSI on the received packet is −60 (dBm) then the total pathloss is +4 (−60)=+64 dB. If a second packet were received at −40 dBm with a Tx Power Level data=+15 dBm the resulting pathloss would be +55 dB. An application may use these pathloss values to choose which device it thinks might be closer (the one with the lower pathloss value).

Unfortunately, due to fading and varying antenna, circuit, and chip characteristics, these resulting pathloss values may have some uncertainty. Some of the uncertainty (for example, due to fading) may be able to be alleviated if multiple packets are received from the same device.

2. Bluetooth™ Host Controller Interface

The Bluetooth™ radio in a device may include the host controller interface that provides a command interface between the host application in the device and the link layer of the Bluetooth™ radio, also referred to as the controller, to enable access to hardware status and control registers of the Bluetooth™ radio.

The host controller interface (HCI) is described in the Bluetooth™ Core 4.0 Specification. The Host will receive asynchronous notifications of HCI events from Host Controller Transport Layer. HCI events are used for notifying the Host when something occurs. When the Host discovers that an event has occurred, it will then parse the received event packet to determine which event occurred. The commands and events are sent between the Host and the Controller. These are grouped into logical groups by function.

The HCI provides a command interface between the host application in a device and the Bluetooth™ link layer, provides access to hardware status and control registers of the Bluetooth™ radio, and provides a uniform method of accessing the Bluetooth™ baseband capabilities.

Discovery Phase HCI Commands And Events

HCI LE Advertising Report Event

The Bluetooth LE device discovery group of commands and events allow a device to discover other devices in the surrounding area. The Bluetooth LE host controller interface includes the HCI LE Advertising Report event that indicates that a Bluetooth device or multiple Bluetooth devices have been detected during an active scan or during a passive scan.

Connection Phase HCI Commands and Events

HCI LE Read Advertising Channel Tx Power Command

The TX Power Level is reported to the host in response to the HCI LE Read Advertising Channel Tx Power Command. The TX Power Level data field may be used to calculate path loss of a received packet when the receiving device measures the RSSI of the received advertising packet.

After the discovery phase is completed, once a Bluetooth device is connected to another Bluetooth device, the received signal strength indication (RSSI) may be used by a receiving device to monitor the received power level of the data communication packets received over the connection. The RSSI value is calculated by the Bluetooth physical layer, and may be read by the host application through the host controller interface (HCI) Read RSSI command.

The Read RSSI command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

The RSSI parameter in the Read RSSI command is a signed 8-bit value, and is interpreted as an indication of arriving signal strength at the antenna measured in dBm. This command reads the Received Signal Strength Indication (RSSI) value from the Controller. For Bluetooth LE transport, a Connection_Handle is used as the Handle command parameter and return parameter. The meaning of the RSSI metric is an absolute receiver signal strength value in dBm to ±6 dBm accuracy.

3. Bluetooth LE Proximity Profile

The Proximity Profile defines the behavior when a device moves away from a peer device so that the connection is dropped or the path loss increases above a preset level, causing an immediate alert. This alert may be used to notify the user that the devices have become separated. As a consequence of this alert, a device may take further action, for example to lock one of the devices so that it is no longer usable.

The Proximity Profile may also be used to define the behavior when the two devices come closer together such that a connection is made or the path loss decreases below a preset level.

The Proximity Profile defines two profile roles to enable devices to detect their proximity: the Proximity Reporter and the Proximity Monitor. The Proximity Reporter is a Generic Attribute Profile (GATT) server on the one device in the connection, which supports a Link Loss Service (mandatory), an Immediate Alert Service (optional), and a transmit (Tx) Power Service (optional). The Proximity Monitor is a GATT client on the peer device in the connection, which monitors the Radio Signal Strength Information (RSSI) of the connection to calculate the signal's path loss. The Proximity Monitor may use the information received from the Proximity Reporter's Tx Power Service to normalize the RSSI value, by subtracting the RSSI from the Tx Power Level. In order to trigger an alert on low RSSI, the Proximity Monitor constantly monitors RSSI.

The Proximity Monitor on one device may maintain a connection with the Proximity Reporter on the peer device and monitor the RSSI of this connection. The Proximity Monitor may calculate the path loss by subtracting the RSSI from the transmit power level of the device of the Proximity Reporter, as discovered using the Reading Tx Power procedure. If the path loss exceeds a threshold set on the Proximity Monitor, it may write in the Alert Level characteristic of the Immediate Alert service, using the GATT Write Without Response sub-procedure, to cause the Proximity Reporter to generate an alert. The Proximity Monitor may also generate an alert when the path loss exceeds the threshold. The duration of the alert may be implementation specific.

The Proximity Monitor specified in the Bluetooth Proximity Profile, may include the following functions:
  Service Discovery from the peer device;
  Characteristic Discovery from the peer device;
  Configuration of Alert on Link Loss to the peer device;
  Alert on Link Loss to the peer device;
  Reading Tx Power from the peer device; and
  Alert on Path Loss locally and to the peer device based on RSSI supervision.

If the path loss falls below a threshold set on the Proximity Monitor it may write in the Alert Level characteristic of the Immediate Alert service, using the GATT Write Without Response sub-procedure, to cause the Proximity Reporter to end the alert. When the path loss is below the threshold the Proximity Monitor should stop alerting.

If link loss occurs during this procedure, then the behavior defined in the Alert on Link Loss procedure may be used.

C. Bluetooth™ Low Energy Device Tracking

Media content sharing may be controlled among different devices by tracking movement of the device. The moving device may be identified by using the device address in Bluetooth Low Energy (BLE) advertisement. However some Bluetooth Low Energy devices running on privacy mode, may use a random device address that changes periodically. One solution for tracking such a device is to track a particular universally unique identifier (UUID)-code in a Bluetooth LE advertisement, such as a UUID for a payment server. But, some applications or operating systems for Bluetooth LE devices, may halt advertisement of the application specific UUID whenever the advertised application goes into background or whenever the device screen turns off, thereby preventing the tracking of the device with this technique.

In accordance with an example embodiment of the invention, a new tracking technique is used by a receiving device to track a Bluetooth Low Energy sender device that uses random device addressing for its advertising packets. During an initial interval while the sender device address remains the same for the advertising packets, the sender device may be tracked by the initial device address and/or the UUID of the received advertising packet. When the advertising packets are received, the UUID in the advertising packet is stored and associated with the initial device address in the packet. The received signal strength indication (RSSI) of the advertising packet is measured and the RSSI value is stored and associated with the initial device address in the packet. And, the periodic interval for receiving the advertising packets is stored and associated with the initial device address in the packet. After the sender device generates a different, unknown random address, the initial address is no longer useful to track the device. For example, if the advertised application goes into background in the sender device or when its device screen turns off, the UUID in the advertisement data may no longer be available for tracking the device.

In accordance with an example embodiment of the invention, other advertising packets are received by the receiving device and the received signal strength indication (RS SI) of the received advertising packet is measured and the RSSI value is stored and associated with the different, unknown random device address in the packet. And, the periodic interval for receiving the other advertising packets is stored and associated with the different, unknown random device address in the packet. The receiving device then determines whether the other advertising packets are received from the sender device, by comparing the stored RSSI value with the measured received RSSI value, enabling tracking the sender device. The receiving device may also determine whether the other advertising packets are received from the sender device, by comparing the stored periodic interval with the measured received periodic interval for receiving the other advertising packets, enabling tracking the sender device. In addition, the receiving device may compare the device address of the other advertising packets to a known address that has disappeared, when a new address is shown in scanning results.

In accordance with an example embodiment of the invention, if the other received advertising packets are determined by the comparison of the measured received signal strengths and/or the measured periodic intervals, to have been received from the sender device, then the UUID unique identifier, if present in the received other advertising packets, may be stored in association with the received different, unknown random device address. The UUID may then be used in tracking the sender device.

In accordance with an example embodiment of the invention, if the other received advertising packets are determined by the comparison of the measured received signal strengths and/or the measured periodic intervals, to have been received from the sender device, then the measured received signal strengths and/or the measured periodic intervals in the received other advertising packets, may be stored in association with the received different, unknown random device address. The measured received signal strengths and/or the measured periodic intervals may then be used in tracking the sender device.

FIG. 1A is an illustration of an example embodiment of a network in a device discovery phase, with one or more discovering devices, such as audio speakers and/or video devices or other multimedia devices 102A, detecting wireless device discovery messages 150 received from a mobile wireless communication device 100. A multimedia device includes, in accordance with at least one example embodiment, at least an individual audio speaker or display device. Multimedia device 102A is scanning for wireless messages 150 associated with the presence of the mobile wireless device 100, while at the same time multimedia device 102A may be connected over a wireless connection 107 to a streaming server 105 that streams content to multimedia device 102A. Alternately, multimedia device 102A may be respectively connected over a wired connection 107 to the streaming server 105, or alternately, it may be a combination of wired and wireless technologies. Alternately, one of the multimedia devices, for example multimedia device 102A, may include the server 105. The multimedia device (or any device) may also track the mobile device without needing a server connection.

The mobile wireless device 100, such as a smart phone, transmits wireless device discovery messages 150. The multimedia device 102A, scans for wireless device discovery messages 150. In an example embodiment of the invention, the wireless device discovery messages 150 may be a Bluetooth™ Low Energy advertising message transmitted by the mobile wireless device 100.

Figure 7:
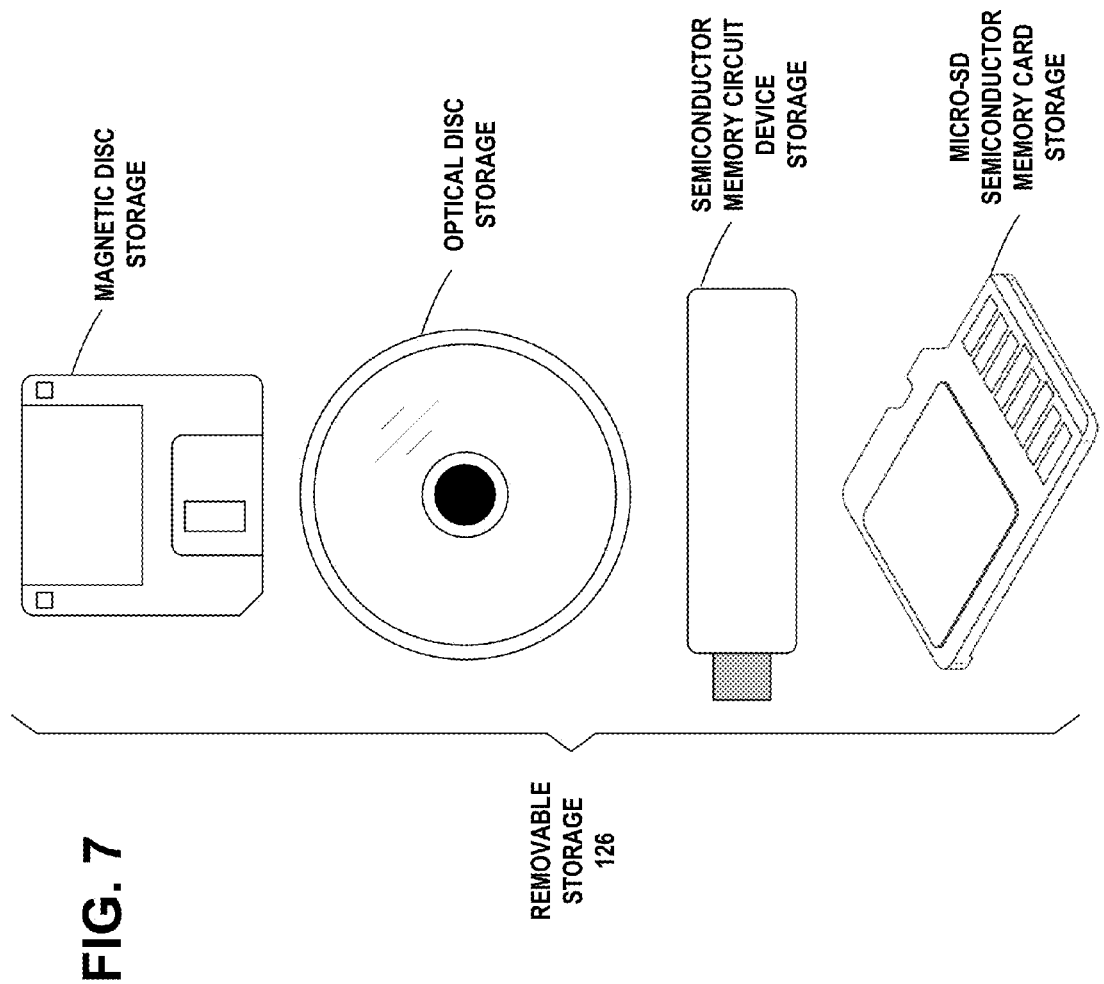
FIG. 7 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In example embodiments of the invention, the wireless mobile device 100 and the multimedia device 102A may include a processor 122 that includes from one to many central processing units (CPUs) 124 and/or 125, a random access memory (RAM) 126, a read only memory (ROM) 127, and interface circuits 128 to interface with one or more radio transceivers 116, antenna 132, 170A, and battery or house power sources. A smart phone may include a keypad, display 144, etc. A wireless multimedia device may include a video display device 142A and/or an audio output port 144A. The RAM and ROM can be removable memory devices such as smart cards, SIMs, WIMs, semiconductor memories such as RAM, ROM, PROMS, flash memory devices, etc., as shown in FIG. 7. In an example embodiment of the invention, the RAM 126 in the multimedia devices 102A may store a measurement of the characteristic RSSI of received wireless device discovery messages, such as 150.

In an example embodiment of the invention, the Bluetooth mobile wireless device 100 and the wireless multimedia device 102A may include control stack 115 that includes a host controller interface (HCI) 111 that provides a command interface between the host respective application 110, 110A in the device and the link layer or MAC 114. The control stack 115, also referred to as the controller, to enables access to hardware status and control registers of the Bluetooth radio 116. The host controller interface (HCI) is described in the Bluetooth™ Core Specification. The Host application 110, 110A, will receive asynchronous notifications of HCI events from HCI 111. HCI events are used for notifying the Host application 110, 110A, when something occurs. When the Host application discovers that an event has occurred, it will then parse the received event packet to determine which event occurred. The commands and events are sent between the Host application 110, 110A, and the radio 116. The HCI 111 provides a command interface between the host application 110, 110A, in a device and the Bluetooth link layer or MAC 114, provides access to hardware status and control registers of the radio 116, and provides a uniform method of accessing the Bluetooth baseband capabilities.

In an example embodiment of the invention, the MAC 114 may be the Bluetooth Low Energy (LE) protocol, the Bluetooth basic rate/enhanced data rate (BR/EDR) protocol, or both protocols.

In an example embodiment of the invention, the mobile wireless communication device 100 may output Bluetooth LE advertising packets 150 on the advertising PHY channels in advertising events.

In another example embodiment of the invention, the mobile wireless communication device 100 may output Bluetooth basic rate/enhanced data rate (BR/EDR) protocol data units (PDU) or packets, such as inquiry response packets and extended inquiry response (EIR) packets 150. The mobile wireless communication device 100 may have been selected as a target device and the wireless discovery messages 150 are Bluetooth inquiry response messages. The selection may be based on user input, or in response to receiving instruction from an external device, such as a server controlling the wireless communication device 100.

In an example embodiment of the invention, the mobile wireless device 100 outputs Bluetooth LE advertising packets on the advertising PHY channels in advertising events. During Bluetooth LE transmission, the RF signal is transmitted by the antenna 132.

In an example embodiment of the invention, the mobile wireless device 100 may be, for example, a miniature device such as a key fob, smart card, jewelry, or the like. In an example embodiment of the invention, the mobile wireless device 100 may be, for example, a relatively larger cell phone, smart phone, flip-phone, PDA, graphic pad. The mobile wireless device 100 may also be in an automobile or other vehicle. The wireless multimedia device 102A may be, for example, audio speakers, video displays, or gaming devices that are either in a fixed position or mobile. In embodiments, the relative sizes of devices 100, 102A may be arbitrary.

During an initial interval while the mobile sender device 100 address remains the same for the advertising packets 150, the sender device 100 transmits advertising packets 150 with the initial device address and/or the UUID of the advertising packet.

When the advertising packets 150 are received by device 102A, the UUID in the advertising packet 150 is stored and associated with the initial device address in the packet.

The received signal strength indication (RSSI) of the advertising packet 150 is measured and the RSSI value is stored and associated with the initial device address in the packet.

The periodic interval for receiving the advertising packets 150 is measured, stored and associated with the initial device address in the packet.

Figure 1B:
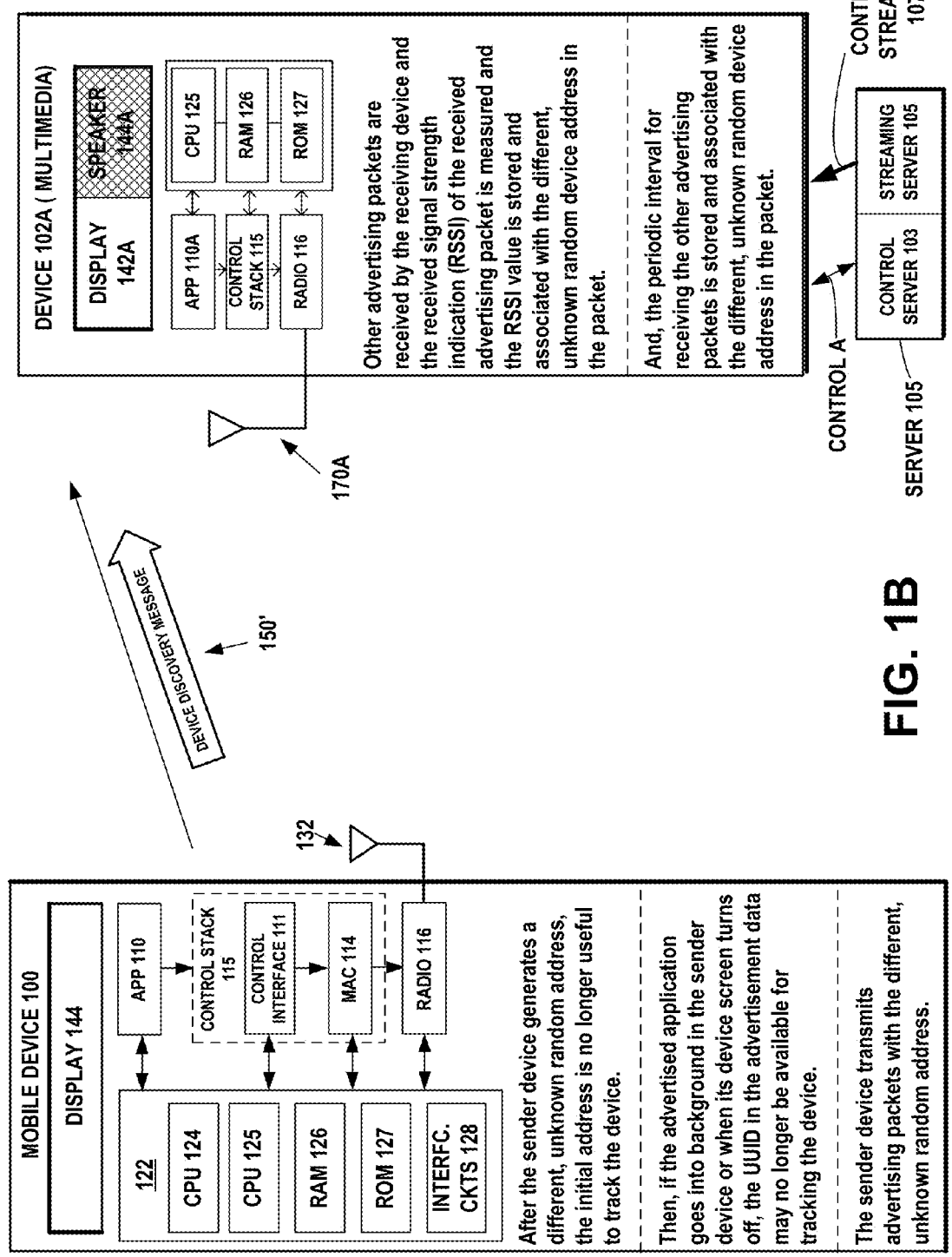
FIG. 1B is an illustration of an example embodiment of the network of FIG. 1A, in accordance with at least one embodiment of the present invention.

FIG. 1B is an illustration of an example embodiment of the network of FIG. 1A. After the mobile sender device 100 generates a different, unknown random address, the initial address is no longer capable of tracking the device 100. Then, if the advertised application goes into background in the sender device 100 or when its device screen turns off, the UUID in the advertisement data may no longer be available for tracking the device 100. The sender device 100 transmits other advertising packets 150' with the different, unknown random address. The advertising packets 150' may also include the UUID, if it is available.

The other advertising packets 150' are received by the receiving device 102A and the received signal strength indication (RSSI) of the received advertising packet 150' is measured and the RSSI value is stored and associated with the different, unknown random device address in the packet 150'.

The periodic interval for receiving the other advertising packets 150' received by the receiving device 102A, is stored and associated with the different, unknown random device address in the packet.

Figure 1C:
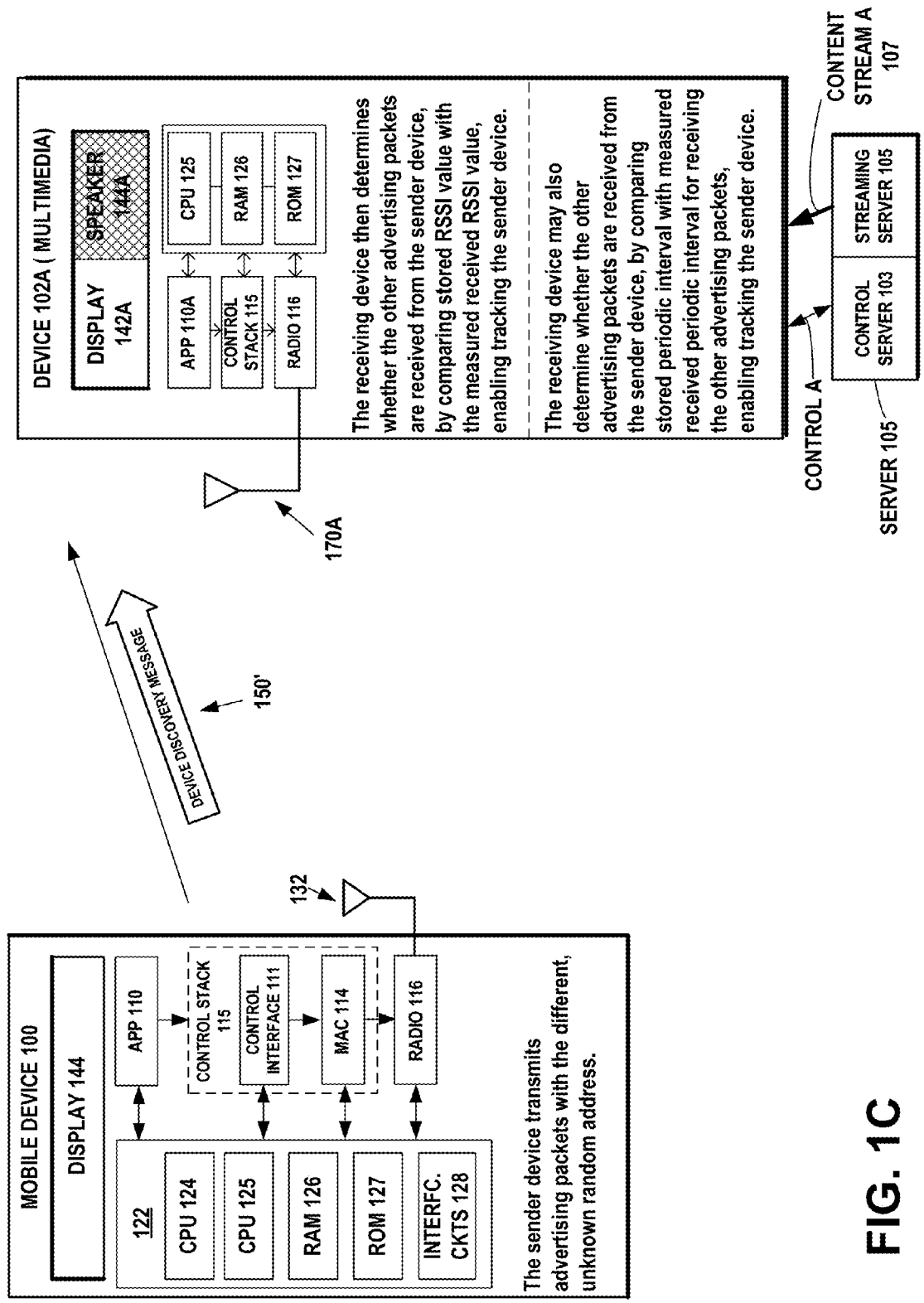
FIG. 1C is an illustration of an example embodiment of the network of FIG. 1B, in accordance with at least one embodiment of the present invention.

FIG. 1C is an illustration of an example embodiment of the network of FIG. 1B. If no other messages are received with the sender device address, then the receiving device 102A determines whether the other advertising packets 150' are received from the sender device 100, by comparing the stored RSSI value with the measured received RSSI value, enabling tracking the sender device 100.

The receiving device 102A may also determine whether the other advertising packets are received from the sender device 100, by comparing the stored periodic interval with the measured received periodic interval for receiving the other advertising packets 150', enabling tracking the sender device 100.

Figure 1D:
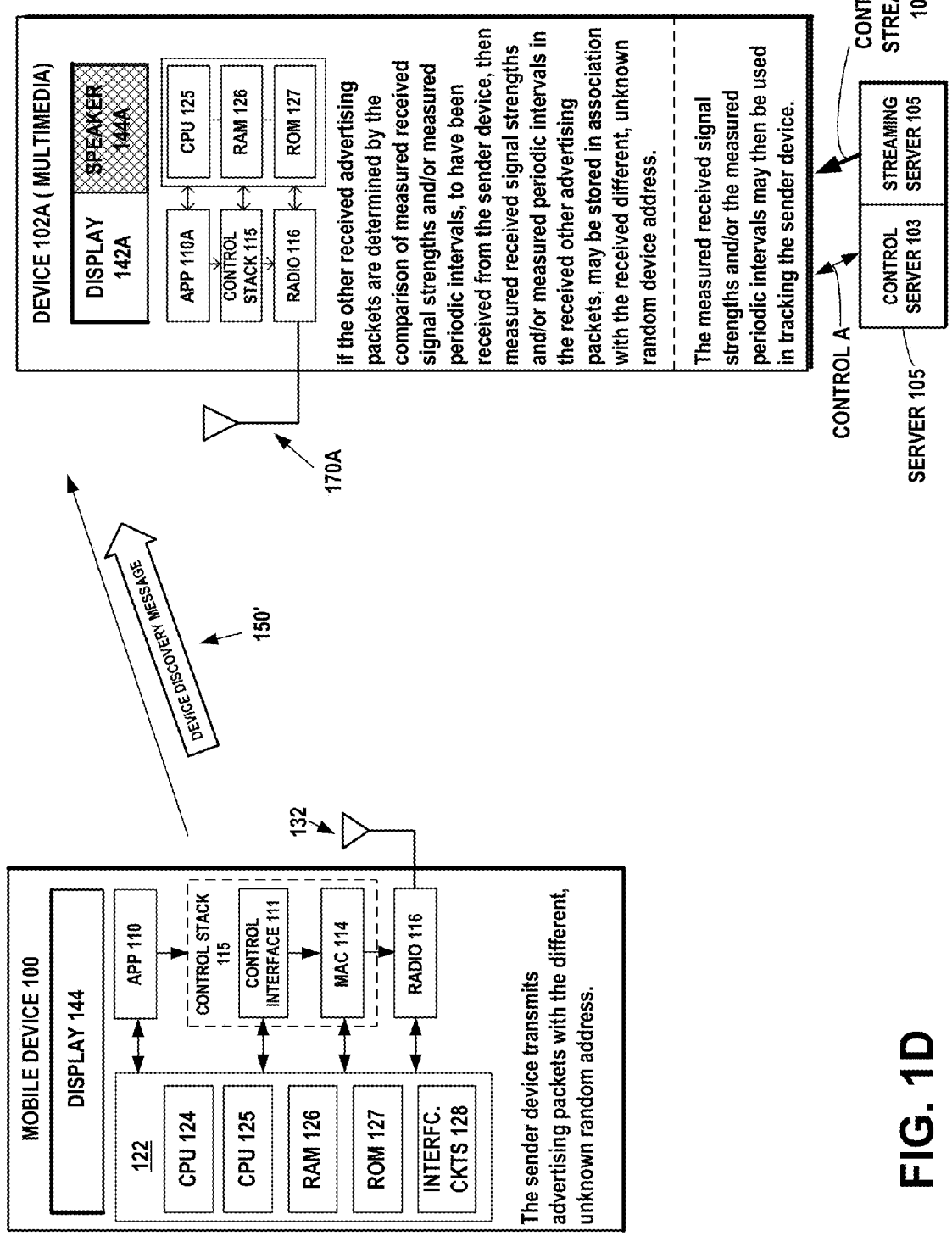
FIG. 1D is an illustration of an example embodiment of the network of FIG. 1C, in accordance with at least one embodiment of the present invention.

FIG. 1D is an illustration of an example embodiment of the network of FIG. 1C. If the other received advertising packets 150' are determined by the comparison of the measured received signal strengths and/or the measured periodic intervals, to have been received from the sender device 100, then the measured received signal strengths and/or the measured periodic intervals in the received other advertising packets 150', may be stored in association with the received different, unknown random device address. The measured received signal strengths and/or the measured periodic intervals may then be used in tracking the sender device.

In accordance with an example embodiment of the invention, if the other received advertising packets 150' are determined by the comparison of the measured received signal strengths and/or the measured periodic intervals, to have been received from the sender device 100, then the UUID unique identifier, if present in the received other advertising packets 150', may be stored in association with the received different, unknown random device address. The UUID may then be used in tracking the sender device 100.

Figure 2:
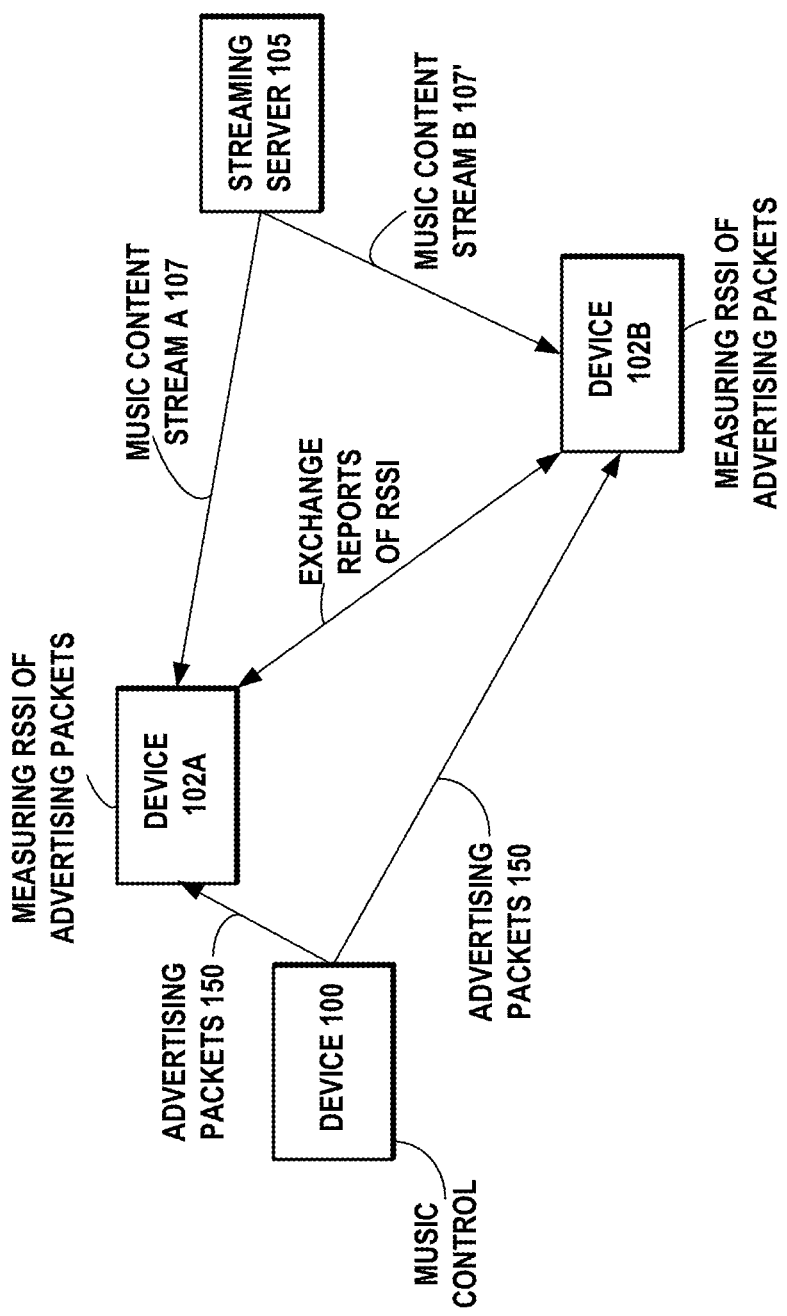
FIG. 2 is an illustration of an example embodiment of a wireless network in a user scenario of a mobile wireless device moving in the vicinity of two wireless multimedia devices, in accordance with at least one embodiment of the present invention.

FIG. 2 is an illustration of an example embodiment of a wireless network in a user scenario of a mobile wireless device 100 moving in the vicinity of two multimedia devices 102A and 102B. The mobile device may control music by selecting which song is played from the music server 105. Multimedia device 102A and multimedia device 102B receive a music stream 107 and 107' from the server 105. Multimedia device 102A and multimedia device 102B also receive wireless discovery messages, such as advertising packets 150, from the mobile wireless device 100. Multimedia device 102A and multimedia device 102B measure the received signal strengths and/or the measured periodic intervals of wireless discovery messages 150 received from the mobile device 100. The multimedia devices 102A and 102B track the position of the mobile device 100, by measuring received signal strengths and/or the measured periodic intervals of the received wireless discovery messages 150 from the mobile device 100, in accordance with at least one embodiment of the present invention. The multimedia devices 102A and 102B may exchange reports of their measured RSSI values and measured intervals between wireless discovery messages. The figure shows the mobile device 100 being closer to device 102A than it is to device 102B. In response to comparing the measured signal strengths and/or the measured periodic intervals of the messages respectively received and reported by multimedia devices 102A and 102B, the multimedia devices 102A and 102B negotiate and agree that multimedia device 102A will play the music content they both receive from the server 105, since the mobile wireless device 100 is determined to be closer to multimedia device 102A.

In the figure, connections between speakers and the music server are wireless, but those may be wireless, wired or a combination of those. For example multimedia device 102A may be connected to a home network with an Ethernet cable, while multimedia device 102B may be connected via a Wi-Fi network. Alternately, the music server (or a group of servers, such as a cloud service) may be located in the Internet and thus may have a multitude of different connection technologies to stream music to multimedia device 102A and multimedia device 102B.

Figure 3:
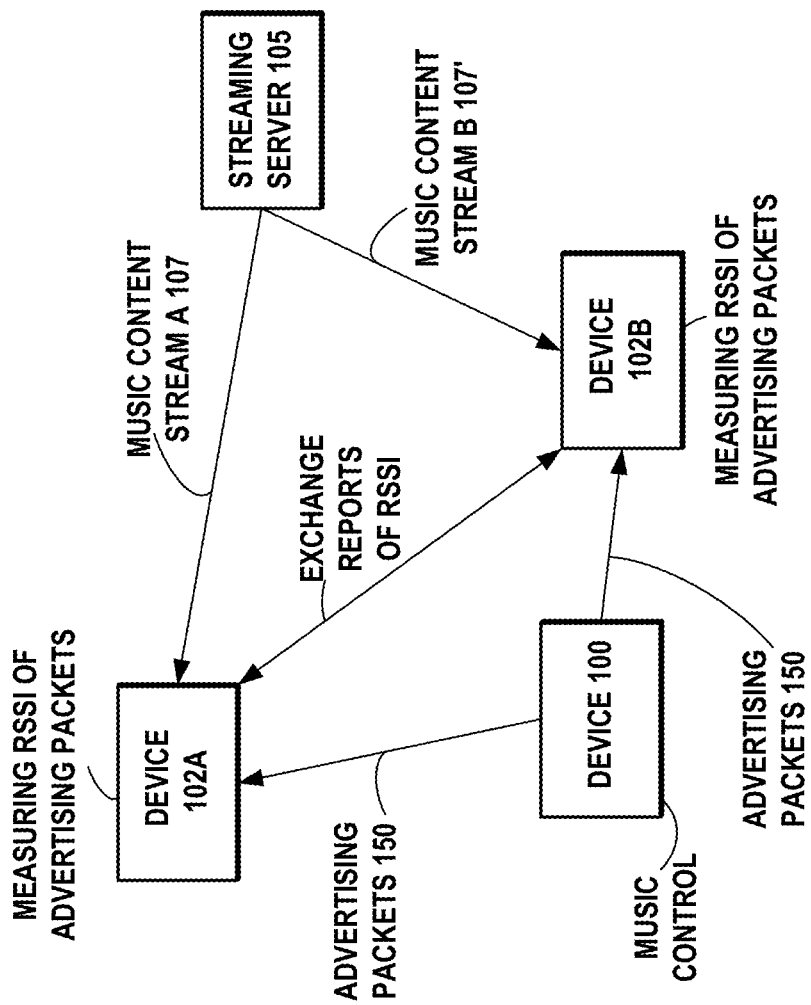
FIG. 3 is an illustration of an example embodiment of a wireless network in a user scenario of a mobile wireless device moving in the vicinity of two wireless multimedia devices, in accordance with at least one embodiment of the present invention.

FIG. 3 is an illustration of an example embodiment of a wireless network in a user scenario of a mobile wireless device 100 moving in the vicinity of two multimedia devices 102A and 102B. The figure shows the mobile device 100 having moved closer to device 102B than it was to device 102A. When the mobile device 100 moves closer to the multimedia device 102B, the multimedia device 102B transmits a report to multimedia device 102A that indicates it is receiving a stronger signal than is being reported by the multimedia device 102A. In response to comparing the measured signal strengths and/or the measured periodic intervals of the messages respectively received and reported by multimedia devices 102A and 102B, the multimedia devices 102A and 102B negotiate and agree that multimedia device 102B will replace device 102A in playing the music content from the server 105, since the mobile wireless device 100 is determined to be closer to multimedia device 102B. Multimedia device 102B then indicates to multimedia device 102A that multimedia device 102B will play the content stream 107' and, in response, multimedia device 102A stops playing the content stream 107. An indication of which song is being streamed and the current playing position in the song is reported from multimedia device 102A to multimedia device 102B, either together with a report of the measured received signal strengths and/or the measured periodic intervals of wireless discovery messages 150 from the mobile device 100, in accordance with at least one embodiment of the present invention.

Figure 4:
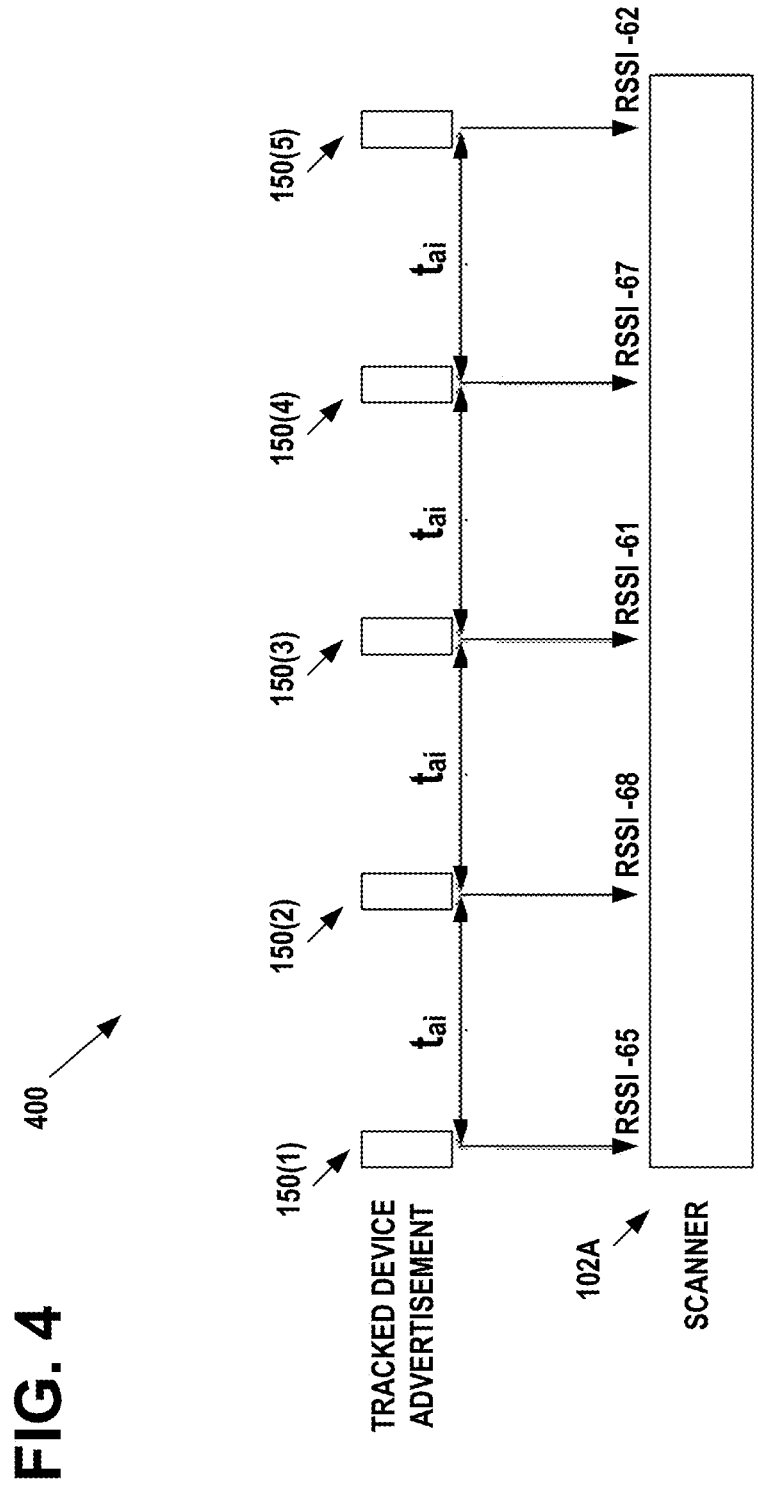
FIG. 4 is a timing diagram of advertisement and scanning, in accordance with at least one embodiment of the present invention.

FIG. 4 is a timing diagram of advertisement and scanning, in accordance with at least one embodiment of the present invention. The mobile wireless device 100 in FIG. 1A, transmits a sequence of wireless device discovery messages 150, such as Bluetooth™ Low Energy advertising messages. The wireless device discovery messages 150 are transmitted at substantially periodic intervals $t_{ai}$ (excluding possible random jitter in timing). FIG. 4 shows the sequence of wireless device discovery messages 150(1), 150(2), 150(3), 150(4), and 150(5) transmitted at substantially periodic intervals $t_{ai}$. The multimedia device 102A in FIG. 1A, scans for wireless device discovery messages 150. The periodic interval is measured by the multimedia device 102A, for the received advertising packets 150(1), 150(2), 150(3), 150(4), and 150(5), and the measured value is stored and associated with the device address of the packets.

The received signal strength indication (RSSI) is measured by the multimedia device 102A, for the received advertising packets 150(1), 150(2), 150(3), 150(4), and 150(5), and the measured value is stored and associated with the device address of the packets. In the example shown in FIG. 4, the measured value of the RSSI for the received advertising packets 150(1), 150(2), 150(3), 150(4), and 150(5) is respectively −65, −68, −61, −67, and −62.

With these measured values, the scanning multimedia device 102A knows (or can predict) when (inside certain window including possible timing jitter) the next advertising packet 150 will arrive and knows (or can predict) what will be the RSSI range of the next advertising packets 150 that will be received from the sending mobile wireless device 100.

Figure 5B:
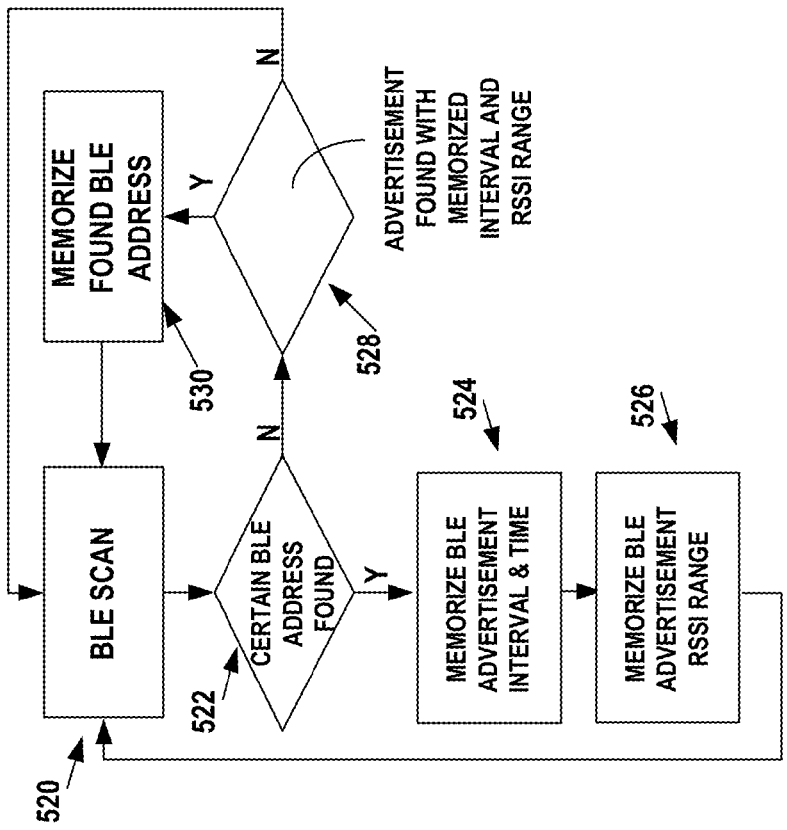
FIG. 5B is an example flow diagram of the process in the multimedia device when the UUID is not present in the received advertising packet, in accordance with at least one embodiment of the present invention.
Figure 5A:
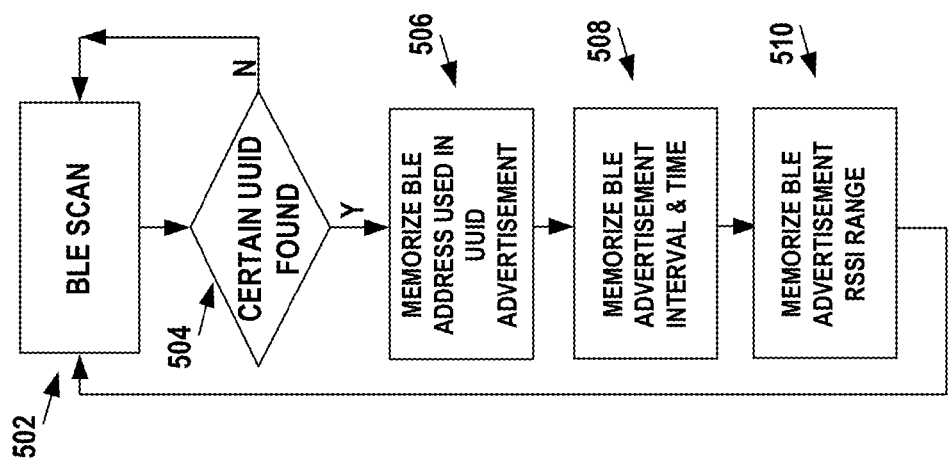
FIG. 5A is an example flow diagram of the process in the multimedia device when the UUID is present in the received advertising packet, in accordance with at least one embodiment of the present invention.

FIG. 5A is an example flow diagram of the process in the multimedia device 102A when the UUID is present in the received advertising packet 150. The multimedia device 102A typically scans for Bluetooth LE advertising packets 150 containing certain advertisement information. For example, a predefined UUID may identify a particular application or may be allocated to a specific sender device.

In step 502, the multimedia device 102A performs scanning for a particular UUID that may identify a particular application or may be allocated to a specific sender device. In step 504, if the particular UUID is not found, then return to step 502. If an advertising packet is received containing the particular UUID, then proceed to step 506. In step 506, the multimedia device 102A stores the device address of the received advertising packet in association with the particular UUID. In step 508, the multimedia device 102A stores the measured periodic intervals and time of receipt of the received advertising packet in association with the particular UUID and the device address. In step 510, the multimedia device 102A stores the measured received signal strength of the received advertising packet in association with the particular UUID and the device address. The advertisement interval is determined by measuring the interval between consecutive receipts of advertising packets coming from this one sender device. The RSSI range is determined by measuring the RSSI of the several advertising packets from this one sender device.

FIG. 5B is an example flow diagram of the process in the multimedia device 102A when the UUID is not present in the received advertising packet 150. When the mobile device 100 changes the content of the advertising data, for example when the advertised application goes into background or the sender device goes to sleep, then the predefined UUID data may no longer be available in the advertising packets. The multimedia device 102A, in this case, may continue to track the mobile device 100 by tracking the device address in advertising packet, which was previously stored in association with the particular UUID for previously received advertising packets. However, some Bluetooth Low Energy devices running in privacy mode, may use a random device address that changes periodically. If the device address changes, then the multimedia device 102A may use the measured received signal strengths and/or the measured periodic intervals of wireless discovery messages 150 from the mobile device 100 to track the mobile device 100 and to store the new, random device address in association the measured values coming from the same sender device.

In step 520, the multimedia device 102A performs scanning for a particular device address that may identify a specific sender device. In step 522, if the particular device address is not found, then proceed to step 528. If an advertising packet 150' is received containing the particular device address, then proceed to step 524. In step 528, the particular device address has not been found.

In step 528, the multimedia device 102A then determines whether the advertising packets 150' are received from the sender device 100, by comparing the stored RSSI value with the measured received RSSI value, enabling tracking the sender device 100. In step 528, the multimedia device 102A may also determine whether the other advertising packets are received from the sender device 100, by comparing the stored periodic interval with the measured received periodic interval for receiving the other advertising packets 150', enabling tracking the sender device 100. Alternately, if the advertisement packets are determined to not be from the sender device 100, then return to step 520.

In step 530, if the other received advertising packets 150' are determined by the comparison of the measured received signal strengths and/or the measured periodic intervals, to have been received from the sender device 100, then the measured received signal strengths and/or the measured periodic intervals in the received other advertising packets 150', may be stored in association with the received different, unknown random device address. The measured received signal strengths and/or the measured periodic intervals may then be used by the multimedia device 102A in tracking the sender device 100.

In step 524, if an advertising packet 150' is received containing the particular device address, then the multimedia device 102A stores the measured periodic intervals and time of receipt of the received advertising packet in association with the particular device address. In step 526, the multimedia device 102A stores the measured received signal strength of the received advertising packet in association with the particular device address.

Figure 6:
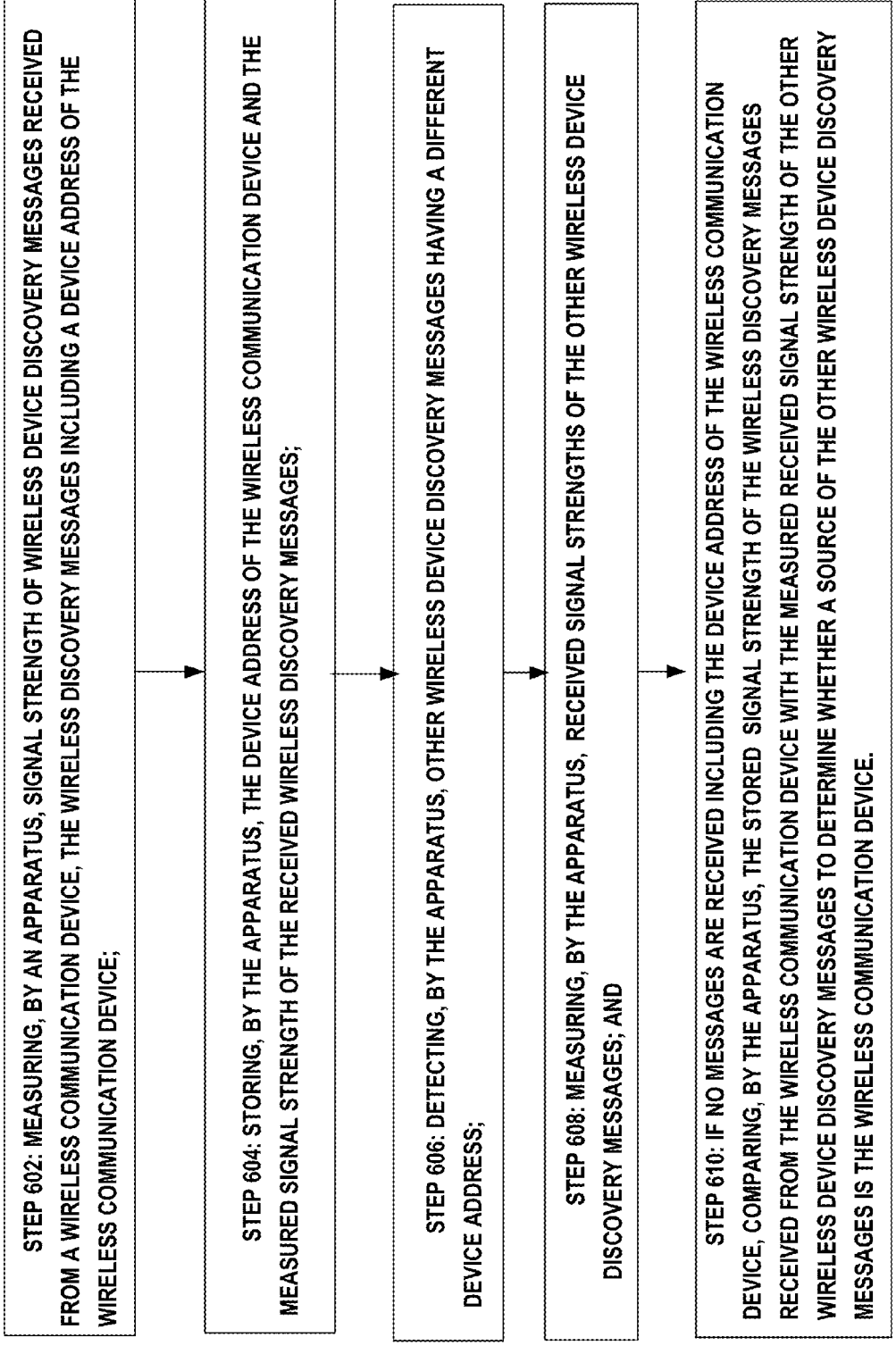
FIG. 6 is an illustration of an example flow diagram of an example process in the multimedia device, in accordance with at least one embodiment of the present invention.

FIG. 6 is an illustration of an example flow diagram 600 of an example process in the multimedia device 102A, in accordance with at least one embodiment of the present invention. The steps of the flow diagram represent computer code instructions stored in the RAM and/or ROM memory of the multimedia device 102A, which when executed by the central processing units (CPU) 125, carry out the functions of the example embodiments of the invention. The steps may be carried out in another order than shown and individual steps may be combined or separated into component steps. The flow diagram has the following steps:

Step 602: measuring, by an apparatus, signal strength of wireless device discovery messages received from a wireless communication device, the wireless discovery messages including a device address of the wireless communication device;

Step 604: storing, by the apparatus, the device address of the wireless communication device and the measured signal strength of the received wireless discovery messages;

Step 606: detecting, by the apparatus, other wireless device discovery messages having a different device address;

Step 608: measuring, by the apparatus, received signal strengths of the other wireless device discovery messages; and Step 610: if no messages are received including the device address of the wireless communication device, comparing, by the apparatus, the stored signal strength of the wireless discovery messages received from the wireless communication device with the measured received signal strength of the other wireless device discovery messages to determine whether a source of the other wireless device discovery messages is the wireless communication device.

FIG. 7 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   measuring, by an apparatus, signal strength of two or more wireless device discovery messages received from a wireless communication device, the wireless discovery messages including a device address of the wireless communication device, wherein the two or more wireless discovery messages are received from the wireless communication device at a first measured periodic interval;
   storing, by the apparatus, the device address of the wireless communication device, the first measured periodic interval of the received two or more wireless discovery messages and the measured signal strength of the received two or more wireless discovery messages;
   detecting, by the apparatus, two or more other wireless device discovery messages having a different device address, at a second measured periodic interval;
   measuring, by the apparatus, received signal strengths of the two or more other wireless device discovery messages; and
   if no messages are received including the device address of the wireless communication device, comparing, by the apparatus, the stored signal strength of the two or more wireless discovery messages received from the wireless communication device with the measured signal strength of the received two or more other wireless device discovery messages and comparing the stored first measured periodic interval with the second measured periodic interval to determine whether a source of the other wireless device discovery messages is the wireless communication device.

2. The method of claim 1, further comprising:
   if it is determined that the source of the other wireless discovery messages is the wireless communication device, associating and storing the device address and the measured received signal strength of the other wireless device discovery messages, to the wireless communication device.

3. The method of claim 1, further comprising:
   if it is determined that the source of the two or more other wireless discovery messages is the wireless communication device, by the comparison of the measured periodic intervals, associating and storing the device address of the two or more other device discovery messages and the second measured periodic interval, to the wireless communication device.

4. The method of claim 1, wherein the wireless discovery messages are Bluetooth Low Energy advertising messages.

5. The method of claim 1, further comprising:
   wherein the wireless discovery messages received from the wireless communication device include a unique identifier;
   if it is determined that the source of the other wireless discovery messages is the wireless communication device, associating and storing the unique identifier, the device address of the other device discovery messages, and the measured received signal strength of the other wireless device discovery messages, to the wireless communication device.

6. The method of claim 1, further comprising:
   wherein the wireless discovery messages received from the wireless communication device include a unique identifier;
   if it is determined that the source of the two or more other wireless discovery messages is the wireless communication device, by the comparison of the measured periodic intervals, associating and storing the unique identifier, the device address of the two or more other device discovery messages, and the second measured periodic interval, to the wireless communication device.

7. An apparatus, comprising:
   at least one processor;
   at least one memory including computer program code;
   the at least one memory and the computer program code configured to, with the at least one processor, cause the apparatus at least to:
   measure signal strength of two or more wireless device discovery messages received from a wireless communication device, the wireless discovery messages including a device address of the wireless communication device, wherein the two or more wireless discovery messages are received from the wireless communication device at a first measured periodic interval;
   store the device address of the wireless communication device, the first measured periodic interval of the received two or more wireless discovery messages and the measured signal strength of the received two or more wireless discovery messages;
   detect two or more other wireless device discovery messages having a different device address, at a second measured periodic interval;
   measure received signal strengths of the two or more other wireless device discovery messages; and
   if no messages are received including the device address of the wireless communication device, compare the stored signal strength of the two or more wireless discovery messages received from the wireless communication device with the measured signal strength of the received two or more other wireless device discovery messages and compare the stored first measured periodic interval with the second measured periodic interval to determine whether a source of the other wireless device discovery messages is the wireless communication device.

8. The apparatus of claim 7, further comprising:
   the at least one memory and the computer program code configured to, with the at least one processor, cause the apparatus at least to:
   if it is determined that the source of the other wireless discovery messages is the wireless communication device, associate and store the device address and the measured received signal strength of the other wireless device discovery messages, to the wireless communication device.

9. The apparatus of claim 7, further comprising:
the at least one memory and the computer program code configured to, with the at least one processor, cause the apparatus at least to:
if it is determined that the source of the two or more other wireless discovery messages is the wireless communication device, by the comparison of the measured periodic intervals, associate and store the device address of the two or more other device discovery messages and the second measured periodic interval, to the wireless communication device.

10. The apparatus of claim 7, wherein the wireless discovery messages are Bluetooth Low Energy advertising messages.

11. The apparatus of claim 7, further comprising:
the at least one memory and the computer program code configured to, with the at least one processor, cause the apparatus at least to:
wherein the wireless discovery messages received from the wireless communication device include a unique identifier;
if it is determined that the source of the other wireless discovery messages is the wireless communication device, associate and store the unique identifier, the device address of the other device discovery messages, and the measured received signal strength of the other wireless device discovery messages, to the wireless communication device.

12. The apparatus of claim 7, further comprising:
the at least one memory and the computer program code configured to, with the at least one processor, cause the apparatus at least to:
wherein the wireless discovery messages received from the wireless communication device include a unique identifier;
if it is determined that the source of the two or more other wireless discovery messages is the wireless communication device, by the comparison of the measured periodic intervals, associate and store the unique identifier, the device address of the two or more other device discovery messages, and the second measured periodic interval, to the wireless communication device.

13. A computer program product comprising computer executable program code recorded on a computer readable, non-transitory storage medium, the computer executable program code comprising:
code for measuring, by an apparatus, signal strength of two or more wireless device discovery messages received from a wireless communication device, the wireless discovery messages including a device address of the wireless communication device, wherein the two or more wireless discovery messages are received from the wireless communication device at a first measured periodic interval;
code for storing, by the apparatus, the device address of the wireless communication device, the first measured periodic interval of the received two or more wireless discovery messages and the measured signal strength of the received two or more wireless discovery messages;
code for detecting, by the apparatus, two or more other wireless device discovery messages having a different device address, at a second measured periodic interval;
code for measuring, by the apparatus, received signal strengths of the two or more other wireless device discovery messages; and
code for if no messages are received including the device address of the wireless communication device, comparing, by the apparatus, the stored signal strength of the two or more wireless discovery messages received from the wireless communication device with the measured signal strength of the received two or more other wireless device discovery messages and comparing the stored first measured periodic interval with the second measured periodic interval to determine whether a source of the other wireless device discovery messages is the wireless communication device.

14. The computer program product of claim 13, further comprising:
code for if it is determined that the source of the two or more other wireless discovery messages is the wireless communication device, by the comparison of the measured periodic intervals, associating and storing the device address of the two or more other device discovery messages and the second measured periodic interval, to the wireless communication device.

15. The computer program product of claim 13, further comprising:
wherein the wireless discovery messages are Bluetooth Low Energy advertising messages and the wireless discovery messages received from the wireless communication device include a unique identifier;
code for if it is determined that the source of the two or more other wireless discovery messages is the wireless communication device, by the comparison of the measured periodic intervals, associating and storing the unique identifier, the device address of the two or more other device discovery messages, and the second measured periodic interval, to the wireless communication device.

* * * * *